United States Patent [19]
Farrell

[11] Patent Number: 6,049,391
[45] Date of Patent: Apr. 11, 2000

[54] SYSTEM FOR PRINTING WITH ORDERED STOCK

[75] Inventor: Michael E. Farrell, Ontario, N.Y.

[73] Assignee: Xerox Corporation, Stamford, Conn.

[21] Appl. No.: 09/004,526

[22] Filed: Jan. 8, 1998

[51] Int. Cl.$^7$ ................................................ G06F 15/00
[52] U.S. Cl. ...................... 358/1.15; 358/1.12; 358/1.13
[58] Field of Search ........................... 395/111, 112, 395/113, 114, 101; 358/1.12, 1.13, 1.14, 1.15, 1.1, 403, 443, 488; 382/309; 399/82, 85, 382

[56] References Cited

U.S. PATENT DOCUMENTS

| | | | |
|---|---|---|---|
| 5,081,595 | 1/1992 | Moreno et al. | 395/111 |
| 5,133,048 | 7/1992 | Parsons et al. | 395/101 |
| 5,596,389 | 1/1997 | Dumas et al. | 399/16 |
| 5,715,381 | 2/1998 | Hamilton | 395/114 |

Primary Examiner—Dov Popovici
Assistant Examiner—Mark Wallerson

[57] ABSTRACT

There is provided a method for producing multiple copies of a set of electronic ordered stock from at least two discrete print media trays. The method includes the step of programming an ordered stock profile in which the set of electronic ordered stock is provided with at least two sequentially ordered electronic pages and each electronic page in the set corresponds with a set of print media properties, wherein the set of print media properties for each electronic page differs from the set of print media properties for any one of the other electronic pages in the set of electronic ordered stock. The method further includes the step of mapping the two sequentially ordered electronic pages of the set of electronic ordered stock to the at least two discrete print media trays so that each copy of the set of electronic ordered stock is produced by delivering a print media sheet from a first one of the at least two discrete print media trays to a marking engine at a first time, a print media sheet from a second one of the at least two discrete print media trays to the marking engine at a second time, wherein the second time is subsequent to the first.

18 Claims, 11 Drawing Sheets

| Pts | Stock Type | Tray |
|---|---|---|
| OSP1, OSP(N+1),... | S1 | T(i) |
| OSP2, OSP(N+2),... | S2 | T(i) |
| OSP2, OSP(N+3),... | S3 | T(i) |
| ⋮ | ⋮ | ⋮ |
| OSPN, OSP(2N),... | SN | T(i) |
| Instructions |||

SYSTEM FOR PRINTING WITH ORDERED STOCK

BACKGROUND

This invention relates generally to a system for managing the delivery of print media to a marking engine in a printing system and, more particularly to a system for executing a print job in which an ordered stock profile is used to control the accessing of multiple print media trays for the sake of producing multiple ordered stock sets for the print job.

Future electronic printers and printing systems are intended to provide the operator or user with as many job programming options and selections as reasonably possible. One very significant programming option is choice of stock, i.e. the print media on which the prints are made. One desirable stock type is ordered stock such as precut tabs, a series of different color sheets, etc. However, when using ordered stock, care must be taken to assure that the correct image is printed on the correct stock throughout the print process. For example, when using precut tabs, one must be sure that the image being printed matches up with the correct tab and that this remains so during the entire printing process. Otherwise, should there be for some reason a mismatch during the printing process, not only will the affected image end up printed on the wrong tab, but the entire sequence of images printed thereafter will be disrupted with the remaining images on the wrong tabs.

In the prior art, U.S. Pat. No. 4,521,102 to Motomura et al discloses a system for counting paper in a copying apparatus in which the number of copies are entered using a keyboard to program a counter, the counter being decremented with each copy made so there is provided a running count that can be used to identify the number of copies to be replaced in the event of a fault. U.S. Pat. No. 4,607,572 to Pou et al discloses a system for printing tags, with a jam detector to detect jams and record any tags lost as a result of a jam. U.S. Pat. No. 4,568,172 to Acquaviva discloses a document set recirculating method for small numbers of documents with separation between sets automatically controlled in response to the number of document sheets in the sets. U.S. Pat. No. 4,774,544 to Tsuchiya et al discloses a counter for an image forming apparatus for counting and managing data forming operations in which an EEPROM is used as a data store when power is interrupted. And U.S. Pat. No. 3,886,329 to Kamiyama discloses a counter apparatus, preset with the number of sheets to be copied, that generates a control signal when the number of copies made is equal to the preset number of sheets to be copied.

U.S. Pat. No. 5,133,048 discloses an approach for printing ordered stock with a high speed electronic printing system in which a selected number of one or more sheets is purged to insure that prints are produced in a correct sequence. More particularly, in accordance with the approach, a group of prints, including plural sets, is preprogrammed so that each set equals a sequence or modulus number (M). The number of prints to be produced for the group is determined and the number of prints to be produced is divided by M. If a remainder (R) exists as a result of such dividing, then (M-R) sheets are purged after the prints corresponding with the plural sets and the one or more prints corresponding with R have been produced.

The '048 Patent further discloses that in the event of a paper jam, the concepts underlying the above approach can be employed to purge sheets so that a correct sequence in the printing of the ordered stock can be maintained. More particularly, a purge number representative of the number of sheets to be purged from a paper path, in the event of a jam in the paper path, is determined. In response to a jam in the paper path, sheets are purged from the paper path and the purge number is employed to determine the number of ordered stock sheets which must be referred for the sake of replacing the purged sheets.

While the technique of the '048 Patent is well suited for its intended purpose, namely to control the printing of ordered stock in an electronic printing system, such technique may not always be optimal in the processing of relatively large jobs. More particularly, as contemplated by the '048 Patent, a single tray is loaded with multiple ordered stock in a collated fashion. This is not necessarily a significant impediment provided a system user responsible for loading the single tray can obtain precollated sets of the ordered stock types, such as precollated tab cut sheet sets. Nonetheless, when processing multiple ordered stock sets, synchronization of images and ordered stock must be maintained and, when processing multiple ordered stock sets from a single tray, it has been found that a number of sheets equaling the modulus or sequence number (M) must be purged from the single tray whenever a jam occurs relative to the printing stock in that single tray.

It is been found, by the present inventor, that the need to purge multiple ordered stock sheets can be greatly alleviated or eliminated by printing M discrete or constituent stock types from multiple trays. While, as demonstrated by U.S. Pat. No. 5,081,595 to Moreno et al and U.S. Pat. No. 5,596,389 to Dumas et al., it is known to print a job by accessing multiple trays, it is not believed that this approach of accessing multiple trays has been used to enhance the area of ordered stock production. It would be desirable to provide a system for managing the feeding of multiple constituent stocks from multiple print media trays in a manner which emulates printing with ordered stock and, in the event of a sheet jam, either alleviates or eliminates the need to purge multiple ordered stock sheets from the system.

The present invention is particularly suited for use in a network environment, such as in the context of the world wide web, the internet or the like. Examples of some recent patents relating to network environments of plural remote terminal shared users of networked printers include Xerox Corporation U.S. Pat. Nos. 5,483,653, 5,243,518, 5,226,112, 5,170,340 and 5,287,194. Some patents on this subject by others include U.S. Pat. Nos. 5,113,355, 5,113,494 (originally filed Feb. 27, 1987), U.S. Pat. Nos. 5,181,162, 5,220,674, 5,247,670; 4,953,080 and 4,821,107. Further by way of background, some of the following Xerox® Corporation U.S. patents also include examples of networked systems with printers: U.S. Pat. Nos. 5,153,577; 5,113,517; 5,072,412; 5,065,347; 5,008,853; 4,947,345; 4,939,507; 4,937,036; 4,920,481; 4,914,586; 4,899,136; 4,453,128; 4,063,220; 4,099,024; 3,958,088; 3,920,895; and 3,597,071. Also noted are IBM Corp. U.S. Pat. Nos. 4,651,278 and 4,623,244, as well as Canon U.S. Pat. No. 4,760,458 and Jap. Pub. No. 59-63872 published Nov. 4, 1984. Some of these various above patents also disclose multi-functional printing systems.

Some other network system related publications include "Xerox Office Systems Technology" "Xerox 8000 Series Products: Workstations, Services, Ethernet, and Software Development" ©1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Informations System, A New Personal Computer . . ."; "Xerox System Integration Standard Printing Protocol XSIS 118404", April 1984; "Xerox Integrated Production Publishers Solutions: "Booklet No. "610P50807" "11/85"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress: The Source Book", Simon & Schuster, Inc., New York, N.Y., 1988, by Harrington, S. J. and Buckley, R. R.; Adobe Systems Incorporated "Post-Script" Language Reference Manual", Addison-Wesley Co., 1990; "Mastering Novell" Netware®", 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87 The Network Computing Architecture and System: An Environment for Developing Distributed Applications", T. H. Dineen, et al, Usenix Conference Proceedings, June 1987.

Noted regarding commercial network systems with printers and software therefor is the 1992 Xerox Corporation "Network Publisher" version of the 1990 "DocuTech® publishing system, including the "Network Server" to customer's Novell® 3.11 networks, supporting various different network protocols and "Ethernet"; and the Interpress Electronic Printing Standard, Version 3.0, Xerox System Integration Standard XNSS 048601 (January 1986). Also, the much earlier Xerox Corporation "9700 Electronic printing System"; the "VP Local Laser Printing" software application package, which, together with the Xerox "4045" or other Laser Copier/Printer, the "6085" "Professional Computer System" using Xerox Corporation "ViewPoint" or "GlobalView®" software and a "local printer [print service] Option" kit, comprises the "Documenter" system. The even earlier Xerox Corporation "8000" "Xerox Network Services Product Descriptions" further describe other earlier Xerox Corporation electronic document printing systems. Eastman Kodak "LionHeart®" systems, first announced Sep. 13, 1990, are also noted.

Current popular commercial published "systems software" with LAN workstation connections include Novell DOS 7.0, "Windows®" NT 3.1, and IBM OS/2 Version 2.1.

All of the references designated in the above Background section are incorporated herein by reference.

SUMMARY OF THE INVENTION

In accordance with the present invention there is disclosed a method for producing multiple copies of a set of electronic ordered stock from at least two discrete print media trays. The method is intended for use with a printing system having the at least two discrete print media trays, a marking engine and a controller in which prints are produced from a print job by using the controller to control delivery of print media sheets from the at least two discrete print media trays to the marking engine. The at least two discrete print media trays respectively include the print media sheets and the method comprises: (a) programming an ordered stock profile in which the set of electronic ordered stock is provided with at least two sequentially ordered electronic pages and each electronic page in the set corresponds with a set of print media properties, wherein the set of print media properties for each electronic page differs from the set of print media properties for any one of the other electronic pages in the set of electronic ordered stock; (b) providing each electronic page of at least one copy of the set of electronic ordered stock with a reference, wherein each reference designates a correspondence between one of the at least two sequentially ordered electronic pages and one of the electronic pages of the at least one copy of the set of electronic ordered stock; (c) mapping the two sequentially ordered electronic pages of the set of electronic ordered stock to the at least two discrete print media trays so that each copy of the set of electronic ordered stock is produced by delivering a print media sheet from a first one of the at least two discrete print media trays to the marking engine at a first time, a print media sheet from a second one of the at least two discrete print media trays to the marking engine at a second time, wherein the second time is subsequent to the first time and (d) using the references provided in said (b) to refeed a print media sheet from one of the at least two print media trays when a print media sheet previously fed from the one of the at least two print media trays must be purged from the system because of a print media jam condition.

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
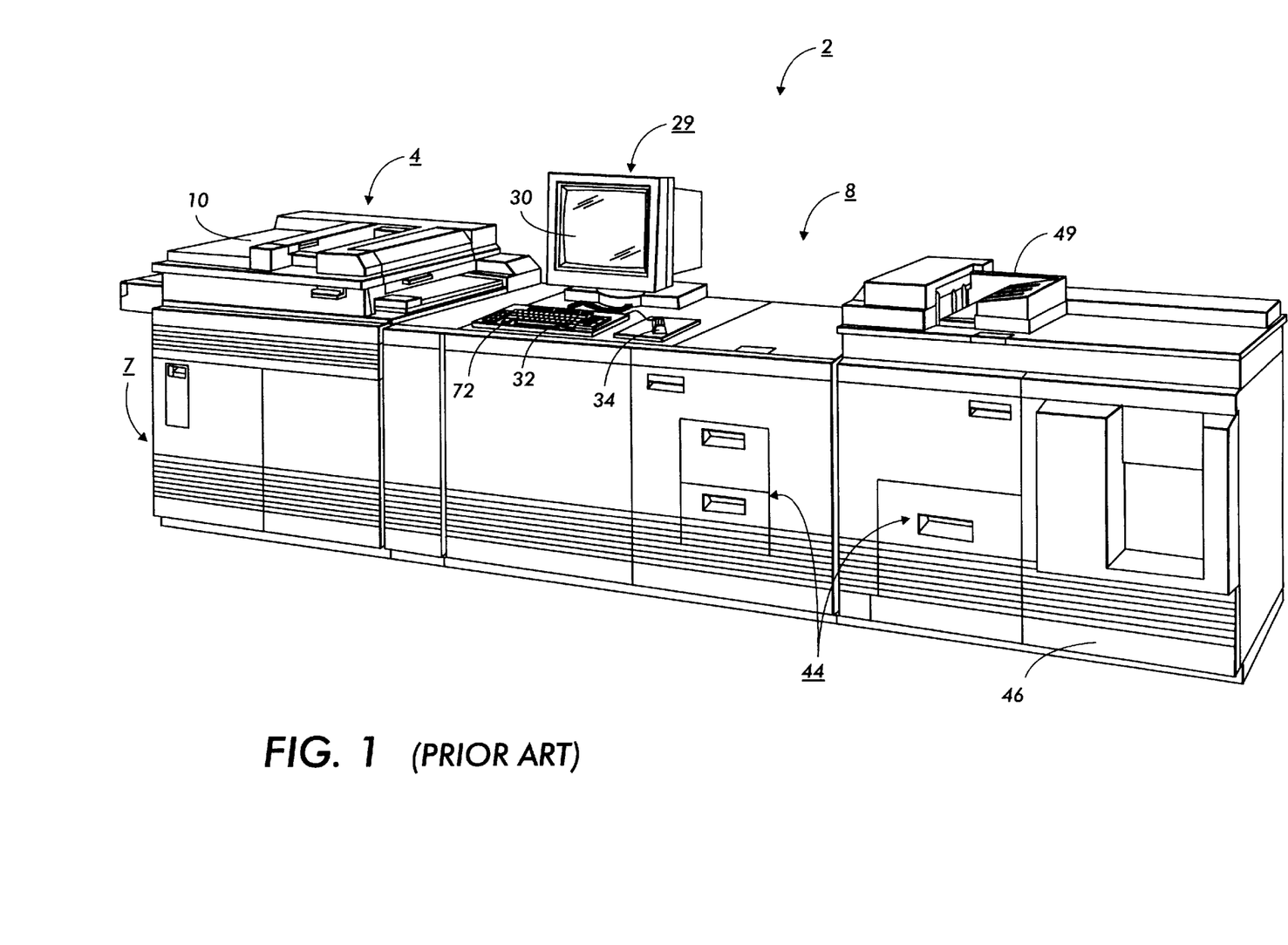
FIG. 1 is a perspective view of an electronic printing system for printing ordered stock in accordance with the present invention.
Figure 2:
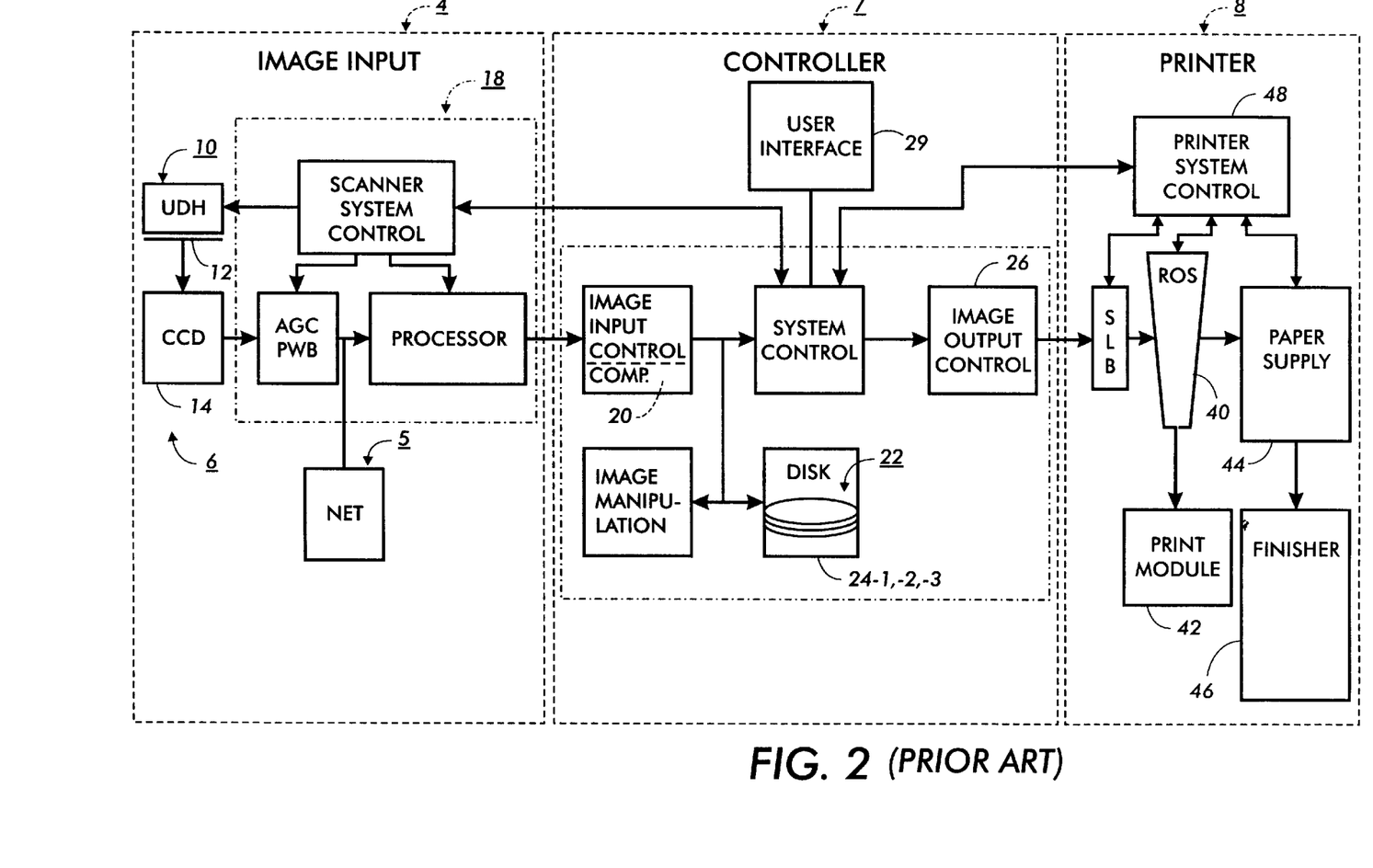
FIG. 2 is a block diagram depicting the major elements for the printing system of FIG. 1.

Referring to FIGS. 1 and 2, there is shown an exemplary image printing system 2 of the type adapted to print ordered stock in accordance with the preferred embodiment. Printing system 2 includes an image input section 4, controller section 7, and printer section 8. Image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer, etc.

For on-site image input, image input section 4 has a document scanner 10 for the purpose of automatically and sequentially placing and locating sets of multiple documents on a platen 12 for scanning by one or more linear light sensitive arrays 14. Array 14, which may utilize Charge-Coupled Device (CCD) technology or the like, provides image elemental signals or pixels representative of the image scanned which are input to processor 18 for processing. Alternatively, documents may be located on platen 12 manually for scanning.

Processor 18 converts the analog image signals output by array 14 to digitally represented facsimile signals and processes the signals as required to enable controller section 7 to store and handle the image in the form and order required to carry out the job programmed. After processing, the image signals are output to controller section 7. A detailed description of a control architecture suitable for use as controller section 7 is provided by either U.S. Pat. No. 5,133,048 to Parsons et al or U.S. Pat. No. 5,243,518 to Holt et al., each of which disclosure is incorporated herein by reference.

For off-site image input, image input section 4 has a network 5 with a suitable communication channel such as a telephone line enabling image data in the form of image signals or pixels from one or more remote sources to be input to processor 18 for processing. Where the Page Description Language (PDL) of the incoming imaging data is different than the PDL used by system 2, suitable conversion means (not shown) are provided. Other remote sources of image data such as streaming tape, floppy disk, etc. may be envisioned. An architecture suitable for use in processing PDL jobs received at the image input section 4 is provided by U.S. Pat. No. 5,493,634 to Bonk et al., the disclosure of which is incorporated herein by reference.

The image data from processor 18 is compressed by image compressor/processor 20 and placed in an image file which is stored in memory 22 pending use. Memory 22 has plural hard disks 24-1, 24-2, 24-3 for this purpose. For printing, the image data is accessed and output to image output controller 26 where the data is decompressed and readied for printing by printer section 8.

As seen in FIG. 1, a User Interface (UI) 29 consisting of a combined operator controller/CRT display provides an interactive touchscreen 30, keyboard 32, and mouse 34. UI 29 interfaces the operator with printing system 2, enabling the operator to program print jobs and other instructions, and to obtain system operating information, visual document facsimile display, programming information and icons, diagnostic information and pictorial views, etc. Items displayed on touchscreen 30 such as files and icons are actuated by either touching the displayed item on screen 30 with a finger or by using mouse 34 to point a cursor 36 (seen in FIG. 3) to the item selected and keying the mouse.

Printer section 8, as shown in FIG. 2, has a laser type printer with a Raster Output Scanner (ROS) 40, Print Module 42, Paper Supply 44, Finisher 46, and Printer System Control 48. ROS 40 uses plural laser beams modulated in accordance with the content of an image signal input by acousto-optic modulator to create latent electrostatic images on a photoreceptor. The latent electrostatic images are developed, transferred and fixed to a print media delivered by Paper Supply 44 (comprising multiple print media trays of the type shown in FIG. 1). The finished prints are delivered to either top tray 49 or to finisher 46 (FIG. 2) which provides certain finishing selections such as a stitching, stapling, etc. Printer system control 48 automatically and precisely controls all the printer functions and operations in accordance with job program instructions received from controller section 7.

While a specific printing system is shown and described, the present invention may be used with other types of printing systems. For example, printer section 8 may instead use a different printer type such as ink jet, ionographic, thermal, photographic, etc., and furthermore may be incorporated in electronic display systems, such as CRTs, LCDs, LEDs, etc., or else other image scanning/processing/recording systems, or else other signal transmitting/receiving, recording systems, etc. as well. A more complete description of printing system 2 may be found in U.S. Pat. No. 5,133,048. Additionally, it should be appreciated that the number of print media or paper trays associated with Paper Supply 44 can be expanded considerably through use of one or more modules of the type used in U.S. Pat. No. 5,596,389 to Dumas et al. or Xerox' 4180 printing system.

Figure 3:
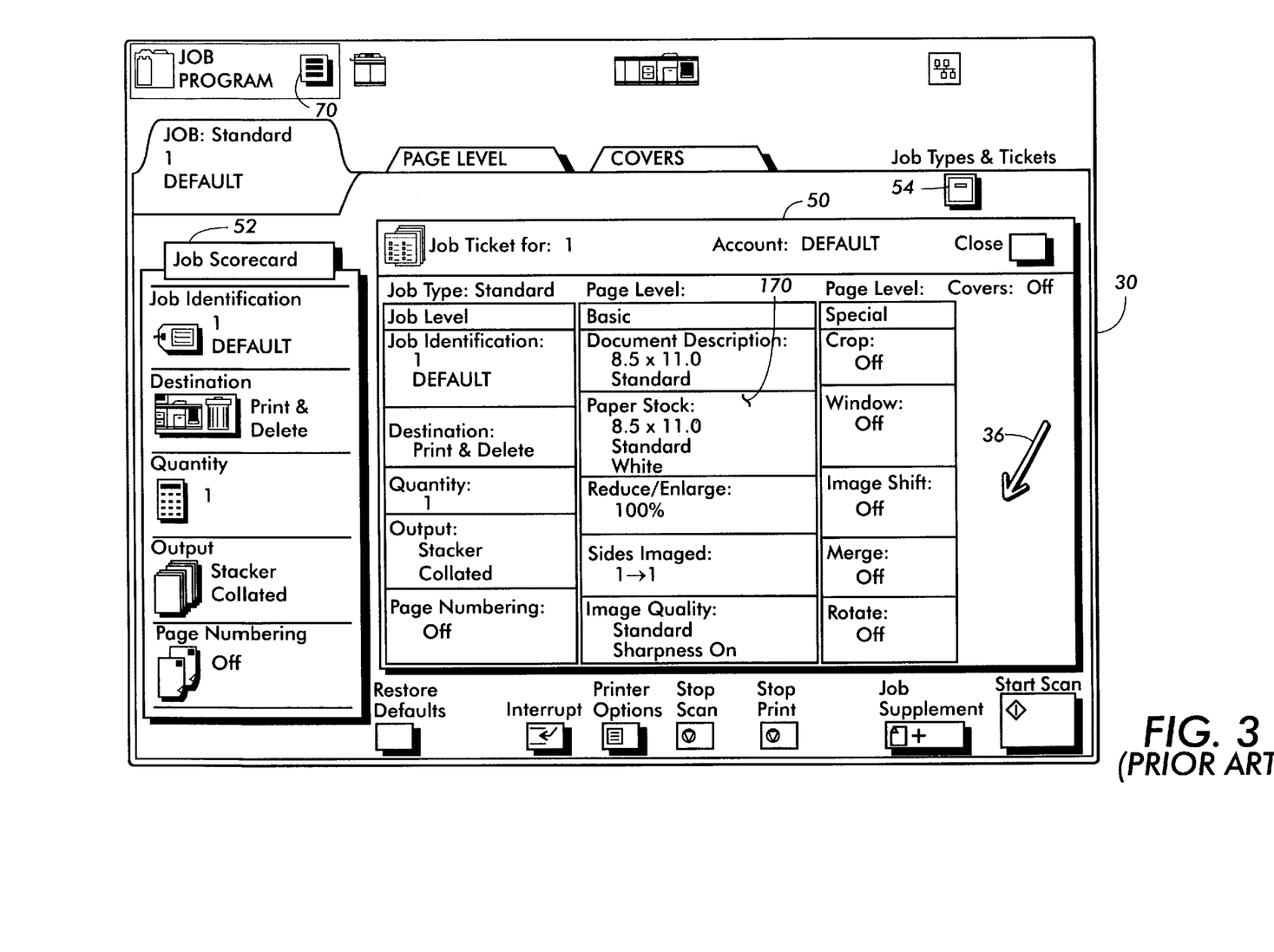
FIG. 3 is an elevational view depicting an exemplary job programming ticket and job scorecard displayed on a User Interface (UI) touchscreen of the printing system shown in FIG. 1.

Referring to FIG. 3, jobs are programmed in a Job Program mode in which there is displayed on touchscreen 30 a Job Ticket 50 and a Job Scorecard 52 for the job being programmed. Job Ticket 50 displays various print program selections available for programming the test job, while Job Scorecard 52 displays the basic instructions to the system for printing the job. Various Job Ticket types are provided, with access by means of Job Types and Tickets icon 54.

Referring still to FIG. 3, one of the selections provided by the "Basic" Scorecard when programming a job is to choose the print stock on which prints will be made. For this, a PAPER STOCK selection 170 is displayed which when actuated displays three levels of stock selections, i.e., "Size", "Type", and "Color" on touchscreen 30 in a work area (not shown) adjacent the Scorecard. The application of a stock selection dialog with stock selection icons to program stock selections for trays 44 (FIGS. 1 and 2) is described in U.S. Pat. No. 5,133,048. Subsequent to such programming, stock selections (except in cases where the stock is currently loaded) are loaded into one or more of the print media trays 44. This is achieved by opening one or more selected trays and inserting stock therein.

Figure 4:
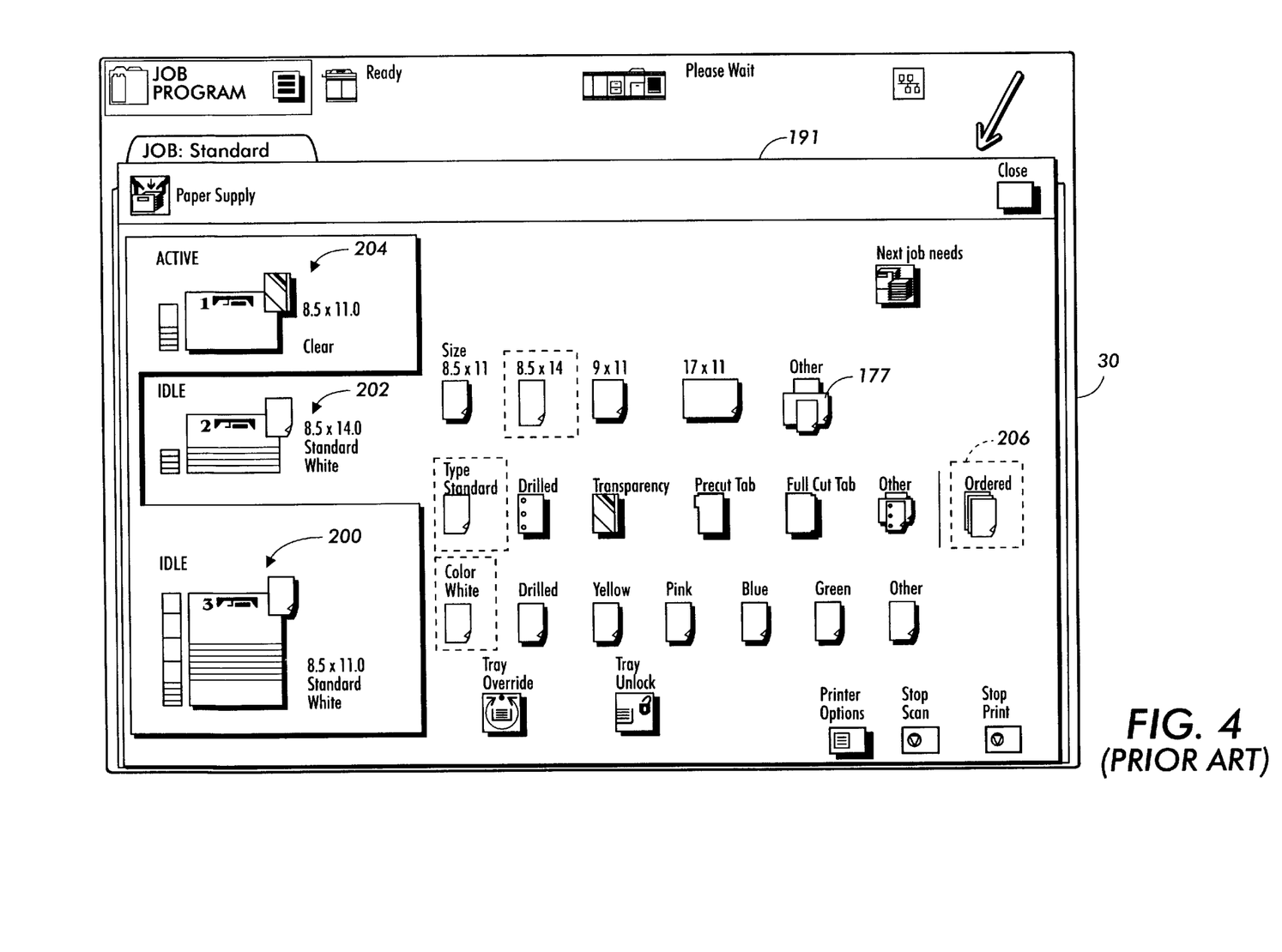
FIG. 4 is an elevational view of a print media supply display showing various print media stock programming selections.

Referring now to FIG. 4, in order to identify the specific stock currently loaded in each of the paper trays 44 (FIG. 1), a "Paper Supply" button on keyboard 32 is actuated to display on touchscreen 30 a "Paper Supply" file card 191 having icons 200, 202, 204 representative of the three print media trays 44 (FIG. 1) respectively. Where a paper stock is changed in one of the paper trays, the icon 200, 202, or 204 for the paper tray is actuated. This results in a three level "Size", "Type", and "Color" display of stock selection icons shown in FIG. 4 in a work-area adjacent the opened tray icon 200, 202, or 204.

Where the print media stock is "Ordered" as in the case of "Precut Tab" for example, additional programming information is necessary in order to insure that the images printed are matched with the correct sheet of stock. This additional programming information, referred to herein as the sequence or modulus number, is required to avoid conflicts and inadvertent operator programming errors, to allow printing system 2 to automatically purge excess sheets, and to enable automatic job recovery in the event of a fault such as a paper jam. Typically, the sequence number is required when either tabbed or ordered stock is selected.

Figure 5:
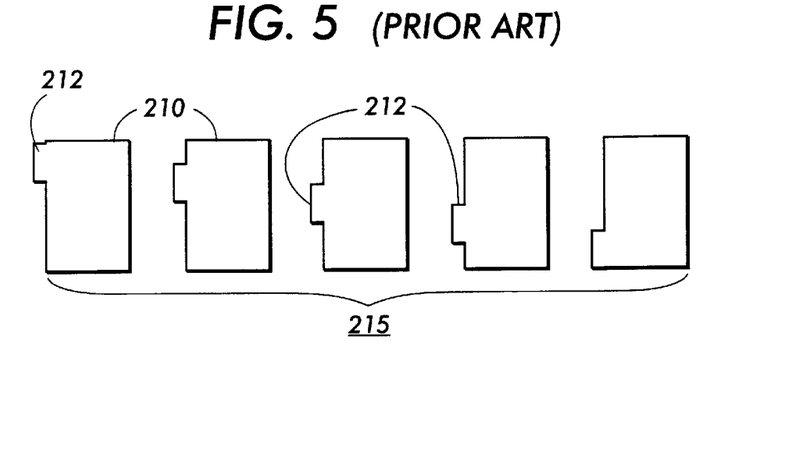
FIG. 5 is an elevational view of a five tab example of precut tab stock.
Figure 6:
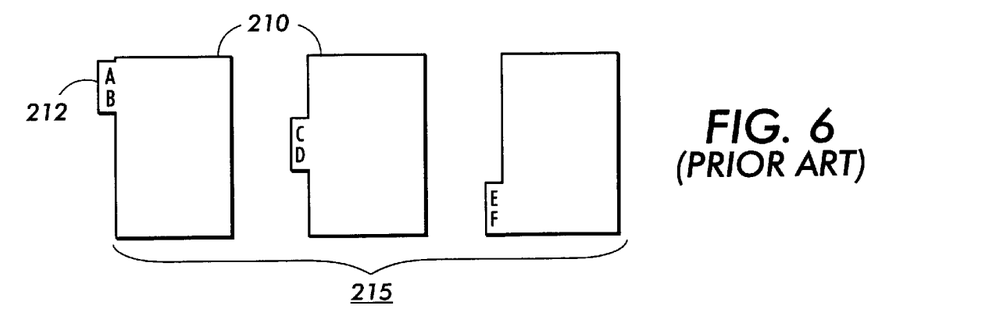
FIG. 6 is an elevational view of a three tab example of printed tab stock.

Referring now to FIG. 5, tabbed stock (i.e. "Precut Tab") comprises a sheet 210 of print media stock having a tab 212 projecting from one side. As will be understood, tabbed sheets 210 are typically used to facilitate access to specific pages or areas in a bound document or book. Tabs 212 may be clear, that is, without printing as shown in FIG. 5 or may have information or data preprinted thereon as in the preprinted tabs shown in FIG. 6.

The location of tabs 212 along the sides of the tabbed sheet 210 are normally offset from one another to prevent one tab from blocking the view of other tabs. The number of tab offset positions determines the number of tabbed sheets 210 in a series or set 215. In the example shown in FIG. 5, a set 215 composed of 5 tabbed sheets is shown. In the example shown in FIG. 6, a set 215 composed of 3 tabbed sheets 215 of preprinted tabs 212 is shown.

Figure 7:
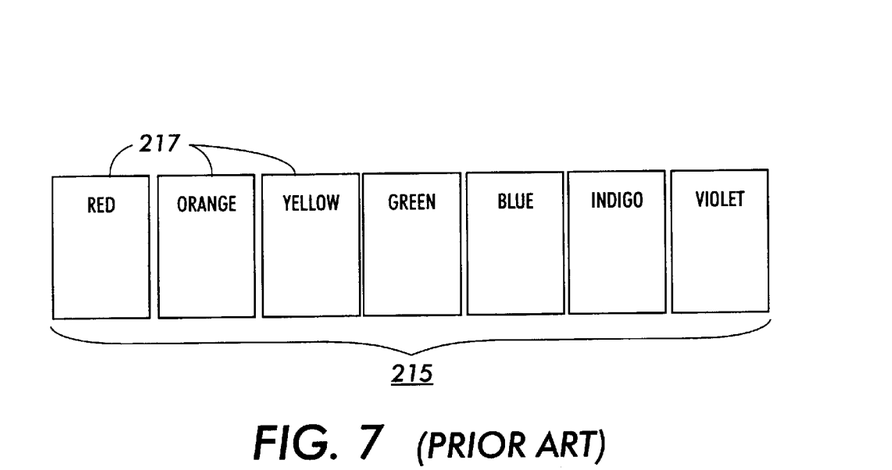
FIG. 7 is an elevational view of an example of ordered print media stock.

Ordered stock may comprise any set of successively different or unique sheets of print media that forms a repetitive pattern or set 215. In the 10 example shown in FIG. 7, a "rainbow" set of stock is shown where the stock 217 consists of 7 different colors, i.e., red orange, yellow, green, blue, indigo, and violet.

The sequence number is essentially a number identifying the number of sheets of stock in a set 215. In the case of "Precut Tab", where the tabbed stock is not preprinted, the sequence number is equal to the number of different tab positions in each set 215. In the example shown in FIG. 5, the sequence number is 5. Where the tabbed stock is preprinted or the stock is ordered, the sequence number is equal to the number of tabs 212 or different sheets per set 215. In the examples shown in FIGS. 6, 7, the sequence number is 3 for the preprinted tabbed stock 210 and 7 for the ordered stock 217.

Figure 8:
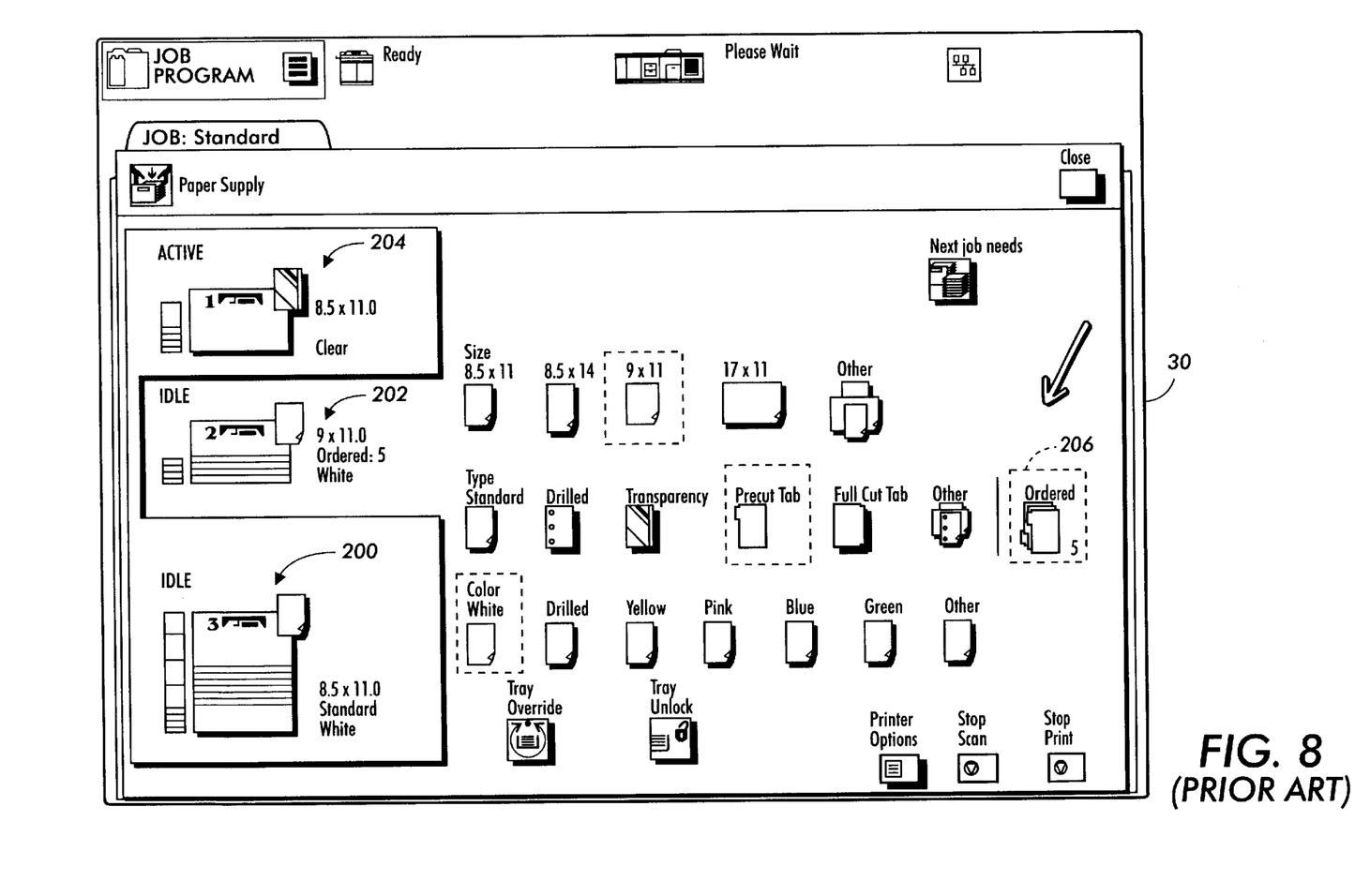
FIG. 8 is an elevational view of the print media supply programming selections displayed in response to actuation of a "Precut Tab" stock icon.
Figure 9:
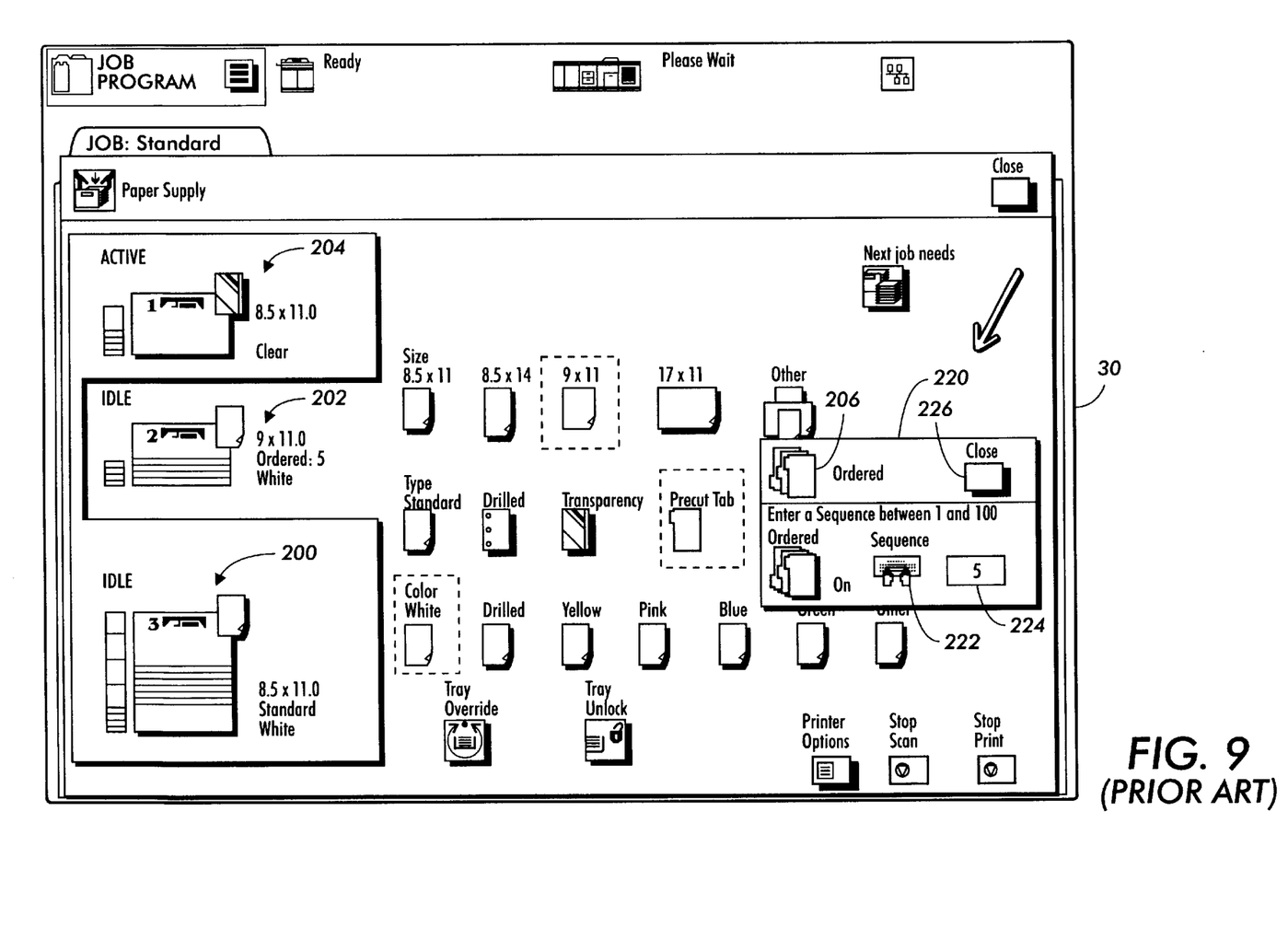
FIG. 9 is an elevational view showing a window display for changing a sequence number when programming "Ordered" stock.

Referring now to FIGS. 8 and 9, where "Precut Tab" stock is selected, the current settings are pictured. In the example shown, these comprise a "Size" setting of "9×11" and a "Color" setting of "White". A default sequence number of 5 is also displayed indicating that the number of different tab positions in each set 210 is five. "Ordered" icon 206 is also highlighted.

Where the operator uses a tabbed stock having a different number of tabs 210 than that represented by the default setting, "Ordered" icon 206 is actuated to display a sequence change window 220. Window 220 incorporates a keyboard icon 222 representative of keyboard 32 of UI 29 and a numeral display window 224 which displays the current sequence setting. Using keyboard 32 (FIG. 1), the operator enters the new sequence number and actuates "Close" icon 226 to program the change.

Similarly, where the operator loads ordered stock having a sequence different than the current sequence setting, "Ordered" icon 206 is actuated to enable keyboard 32 as described. Using keyboard 32, the operator enters the correct sequence number.

Figure 10:
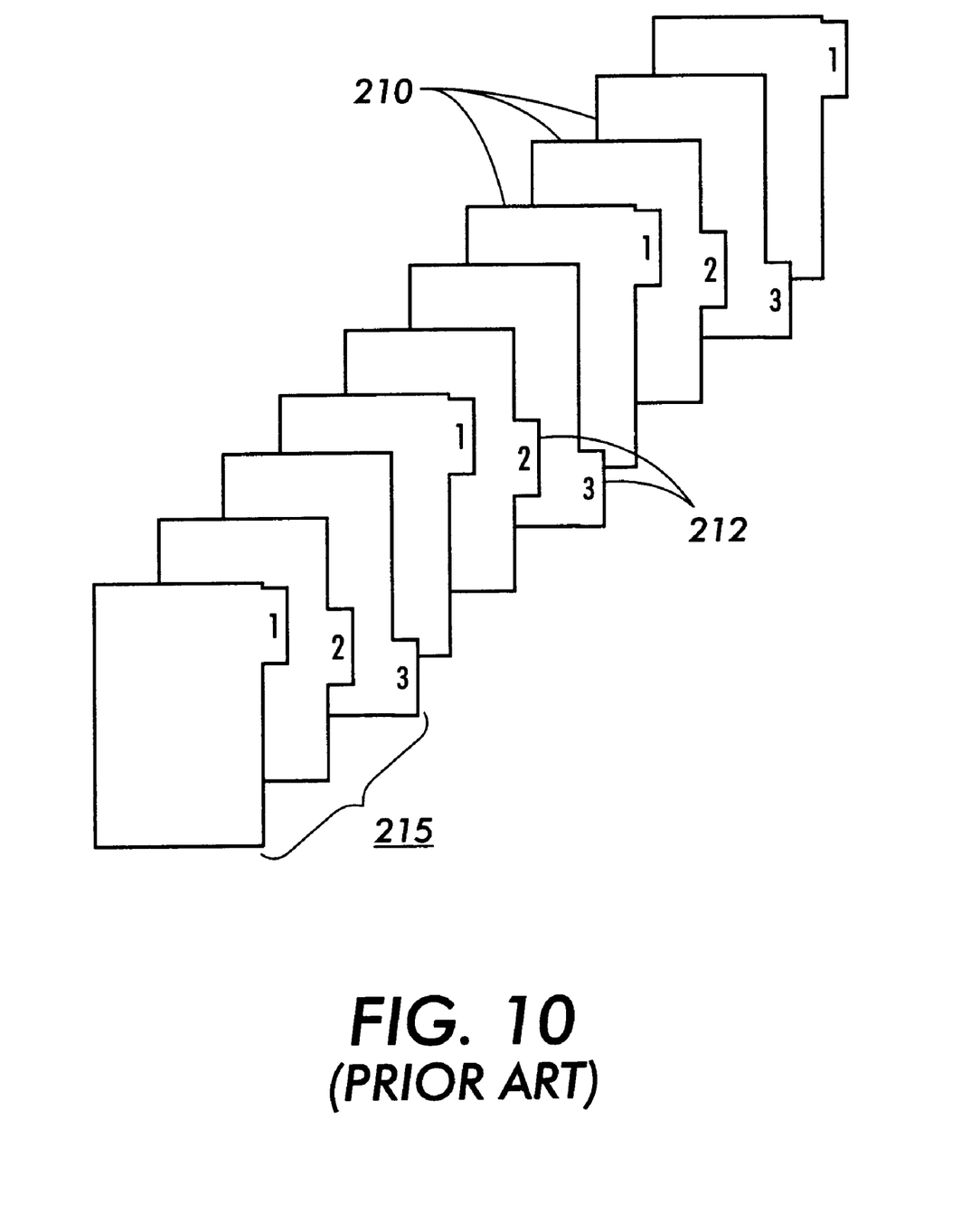
FIG. 10 is an isometric view of an exemplary print job in which the number of tabs in each set is not an exact multiple of the number of tab positions used.

Referring to FIG. 10, in accordance with teachings of the prior art, where a print job is programmed in which the number of tabs in each print group is not an exact multiple of the number of tab positions being used, the extra or additional tabs must be purged if synchronization between the prints and the tabbed stock is to be maintained. In the example shown in FIG. 10, the number of tabs per output group is 10 while the number of tab positions is 3. The sequence number is 3 which when divided into 10 shown that 3 sets of prints on tabbed stock together with a single print will result. It can be seen therefore that there will be 2 unused tabbed sheets at the end which unless purged from the system, will erroneously receive the first two images from the next group of prints. Similarly, should a paper jam occur during the printing cycle, not only must the prints lost be reprinted but also the tabbed sheet or sheets associated with the replaced prints be in effect re-ordered to assure that the make up print or prints are printed on the correct X tabbed sheet. Using the sequence number, the system can identify the tabbed sheets to be purged in cases such as these.

Figure 11:
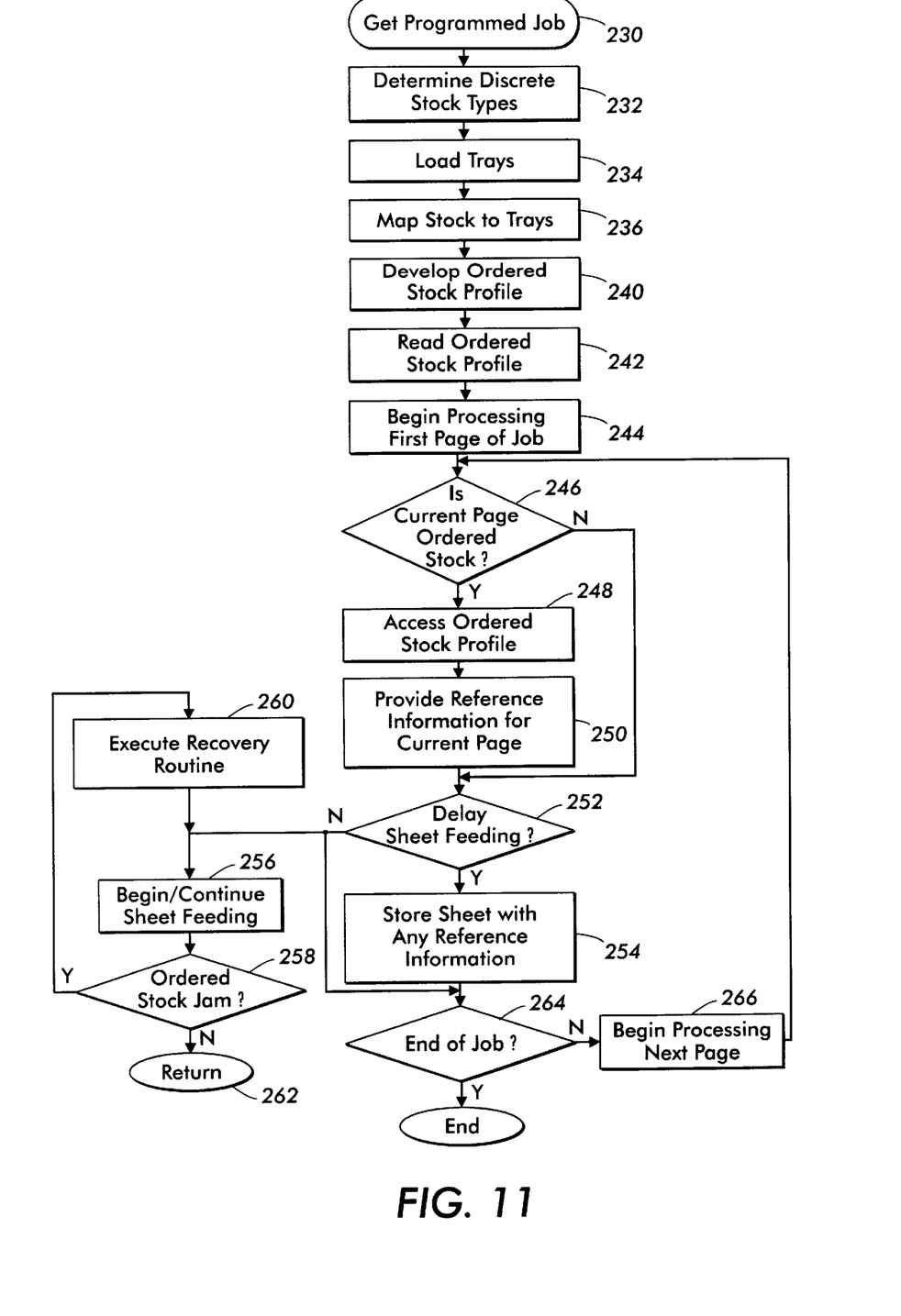
FIG. 11 is a flow diagram depicting a first technique embodying a first aspect of the present invention in which ordered stock sets are produced from multiple print media trays.

Referring now to FIG. 11, a technique which makes the prior art purging associated with FIG. 10 unnecessary is shown. As will appear, for a given ordered stock set, only the sheet or sheets actually involved in a jam need be discarded in the event of a jam recovery performed in accordance with the technique of FIG. 11. To initiate the technique, a job programmed for ordered stock is obtained from memory at step 230 and the number of discrete stock types associated with the job is determined at step 232. With knowledge regarding the stock types for which the job accommodates, stock selections are, by way of step 234, loaded into the print media trays 44 (FIG. 1) (as well as any additional module tray which may be coupled with the printing system 2). Using the stock selection dialog of U.S. Pat. No. 5,133,048, the stock selections of the program are then mapped to the print media trays (step 236) employed for the job.

Figure 12:
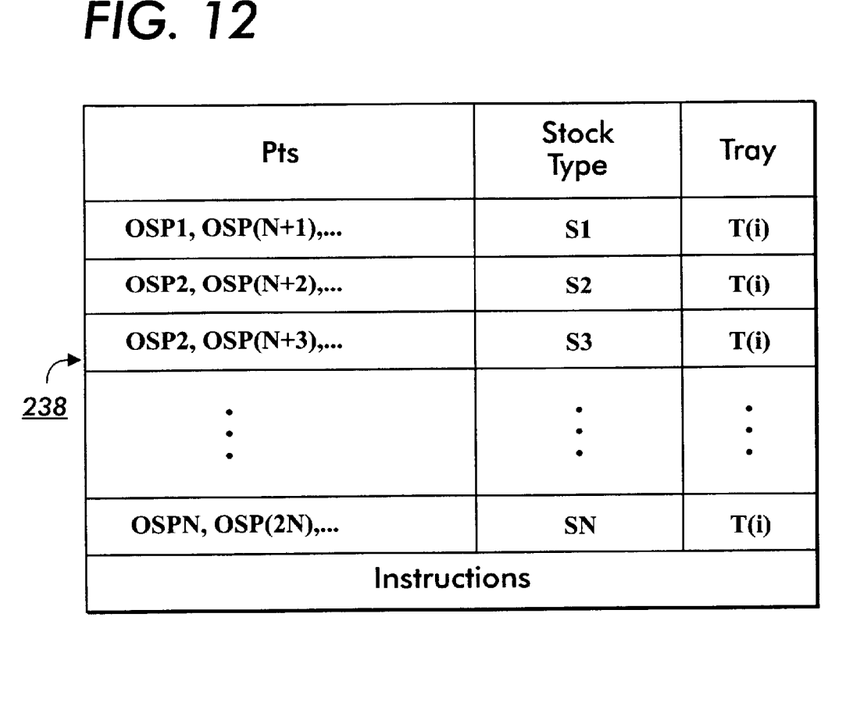
FIG. 12 is an elevational view of an ordered stock profile used to facilitate implementation of the first technique shown in FIG. 11.

As contemplated by the preferred embodiment, an ordered stock profile 238 is developed by a user, at step 240, to accommodate for the production of ordered stock sets for the job. It should be appreciated that the ordered stock profile can be developed prior to 230 and simply provided at step 238. As shown in FIG. 12, the ordered stock profile includes, among other information, a list of constituent stocks intended for use in producing one or more ordered stock sets (namely "S1", "S2", "S3", . . . "SN"), a column of pointers ("Pts") column for referencing one or more ordered stock pages ("osp__") to stock type, and a "Tray" column for mapping the list of ordered stock to be produced with print media trays.

In programming the job at the printing system 2, it is easy for a user to map the stock types of an ordered stock job to the trays in which the discrete stock type components of the ordered stock sets are to be disposed. For instance in a job with multiple tabbed sheet sets where each tabbed sheet set having a sequence or modulus number of three, tab stock corresponding with a first tab position is mapped to a first print media tray, tab stock corresponding with a second tab position is mapped to a second print media tray, and tab stock corresponding with a third tab position is mapped to a third print media tray.

The preferred embodiment further contemplates, however, that this mapping of ordered stock to print media trays can be achieved remotely of the printing system 2 on a network with a service disposed in a server arrangement of the type disclosed by either U.S. Pat. No. 4,839,829 to Freedman, U.S. Pat. No. 5,220,674 to Morgan et al. or U.S. Pat. No. 5,467,434 to Hower et al. In such a server arrangement, the remote user would determine what stock types are available in remote trays 44 (and any other trays provided by way of a module with print media trays) and then provide tray designations under the "Tray" column. Furthermore, through use of the communication system of the type disclosed by U.S. Pat. No. 4,839,829 to Freedman or U.S. Pat. No. 5,130,806 to Reed et al., it is contemplated that the remote user could provide a printing system operator with further ordered stock processing instructions. In one example such instructions might include a proposed time at which the job is to be processed, preferred physical loading orientation (e.g., face up or face down) etc.

In the illustrated embodiment of FIG. 11, the referencing of electronic ordered stock pages to the list of stock type is performed subsequent to step 240; however, as will appear from the description below, such referencing can be performed with step 240 at the network service.

Referring to FIGS. 11 and 12, at step 242, the ordered stock profile is read and processing of the job is initiated at step 242. In conjunction with the process initiation step 244, a pointer is indexed to S1 of the profile 238—the significance of such indexing will appear from the following discussion. In the illustrated embodiment of FIG. 11, each page of the job is examined for the sake of scheduling the same for marking. Pursuant to this process, a check is performed at step 246 to determine if the page being scheduled is an ordered stock page, i.e. to determine if the page is part of a predefined ordered stock set. Assuming that the current page being scheduled is to be an ordered stock page, the ordered stock profile is accessed (step 248) so that a suitable pointer referencing the current page with one of the stock types listed in the profile 238 can be provided by way of step 250. In one example, the profile is provided with an identifier (e.g. "Sam's Stock") so that the ordered stock profile is accessed suitably each time the query of step 246 is answered in the affirmative.

Essentially the pointer is moved throughout the process of FIG. 11 in response to an indexing routine. That is, for the first page (namely osp1) the pointer is used to link ospi with S1. After osp1 has been referenced to S1, the index is moved down one row so that osp2 can be referenced to S2 at the next pass, and so on. It follows that, due to the nature of ordered stock production, assignment of pointers will follow a periodic pattern so that for a second ordered stock set copy, osp(N+1) will be assigned to S1, osp(N+2) to S2, and so on. It should be recognized, in view of the present discussion, that sets of pointers could, due to the periodic nature of ordered stock production, be generated automatically either on the basis of predefined parameters, e.g. number of ordered stock sets to be produced and modulus number, or after a first set of pointers has been created.

In view of U.S. Pat. No. 5,184,185 to Rasmussen et al , it will be recognized that the job need not be marked immediately after it is scheduled. Accordingly, step 252 permits an ordered stock sheet, with its corresponding pointer, to be stored (via step 254) or delivered to a print feed path of the printer 8 (step 256) (FIG. 2). For those instances in which a print media sheet is being delivered to the print feed path, a jam can occur, i.e. the sheet can get hung up in the paper path. In accordance with the disclosure of U.S. Pat. No. 5,133,048, when a jam occurs with respect to one of the sheets in an ordered stock set, M sheets (where M is the modulus or sequence number of the ordered stock set) must be purged from the printing system 2.

In contrast to the purge approach of the '185 Patent, when a jam occurs with the present technique so that the condition of step 258 is positive, the recovery routine followed, via step 260, minimizes the number of stock pages which need be purged. More particularly, when a jam occurs the system initially determines the source of the jam with the aid of a conventional sensor array adapted to monitor both the print media trays and the paper feed path for determining the origin of each sheet as it is either fed from one of the print media trays or transported through the paper feed path. With a knowledge of the origin of a given stock sheet, the system controller 7 (FIG. 2) can access the ordered stock profile (FIG. 12) and determine, by reference to the current index (or current pointer position), the electronic ordered stock page corresponding with the print media sheet that was just previously fed. In this way, the system can ascertain which image(s) and sheet(s) require recorresponding to accomodate for the jam. In a significant number of instances, only one stock sheet will require purging by way of step 260.

Since the technique of FIG. 11 contemplates parallel processing with respect to scheduling and marking, sheet feeding can be temporarily halted or completed (via the return at step 262) while job scheduling can be continued, provided the "End of Job" condition at step 264 is not positive. Assuming that another page requires processing, step 266 is accessed so that another page (possibly an ordered stock page) can be scheduled for marking. It is contemplated that the index for the pointers of the ordered stock profile can be incremented either at step 250 or 266. Additionally, while the technique of FIG. 11 shows an approach in which the ordered stock profile is provided with pointers pursuant to marking (or, at least, in anticipation of marking), the technique contemplates a situation in which the pointers are added to the job at a remote input device or service.

Figure 13:
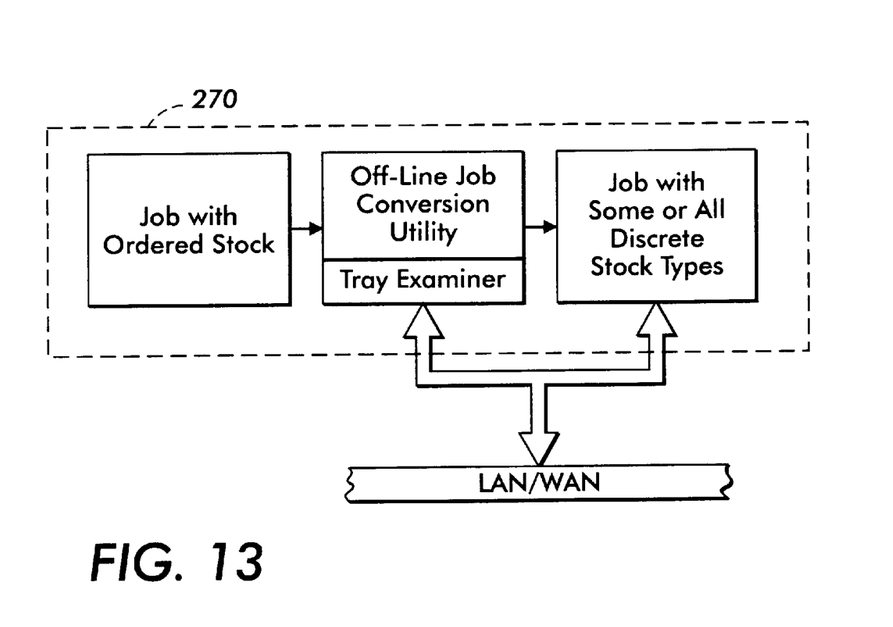
FIG. 13 is a block diagram showing a network service with a conversion utility and tray examiner, the conversion utility being used to facilitate implementation of the first technique shown in FIG. 11.

Referring to FIG. 13, a system, including a network service 270, for automatically adding pointers to a job is shown. With the illustrated system, a job, programmed in accordance with the teachings of U.S. Pat. No. 5,133,048 (labeled "Job with Ordered Stock") is introduced to an "Off-Line Job Conversion Utility" so that an ordered stock profile of the type described above can be developed. As can now be recognized, in view of the description above, a job can be scanned with the Utility, on a page-by-page basis, so that steps 248 and 250 can be performed for each ordered stock page.

Figure 14:
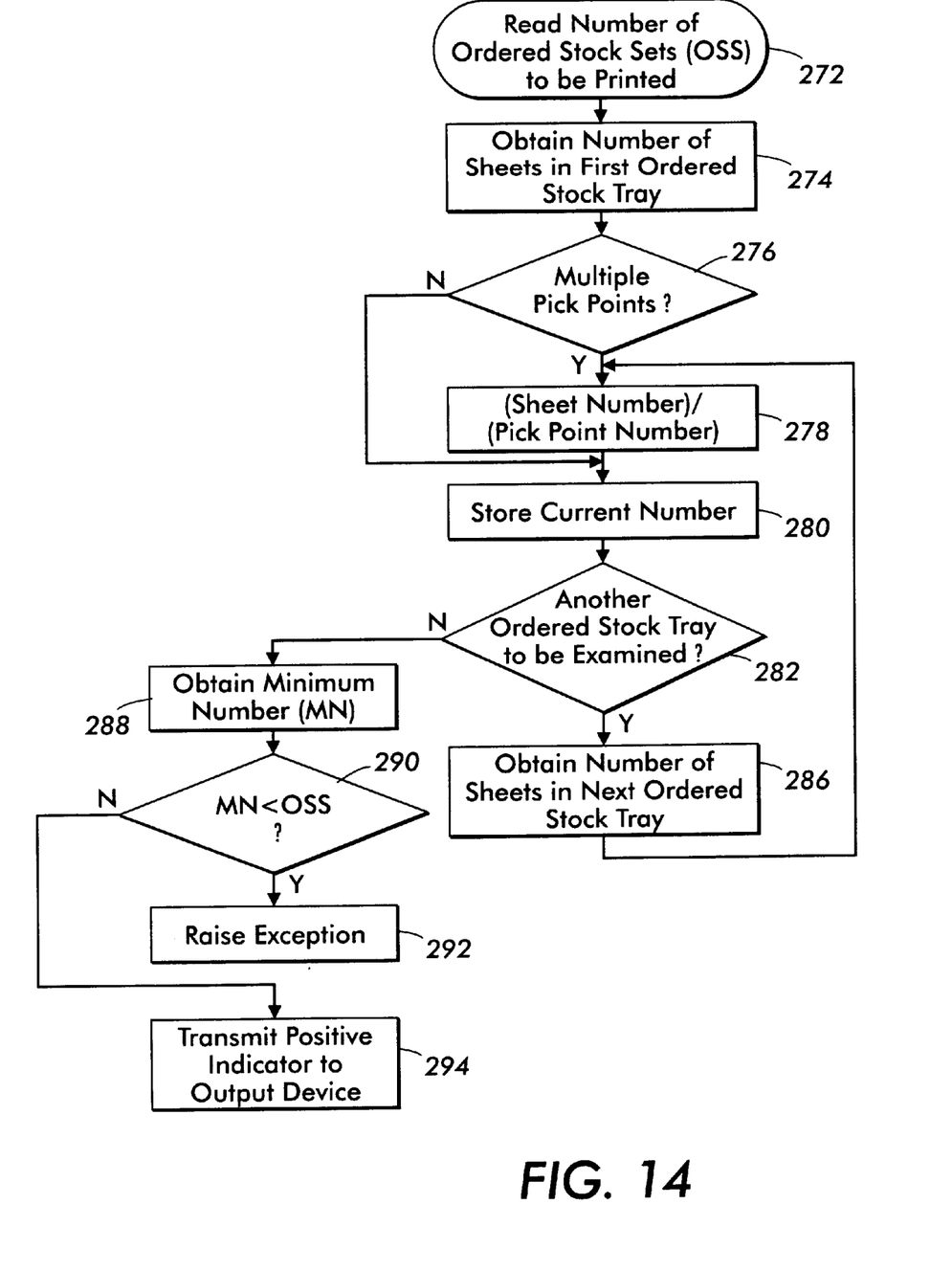
FIG. 14 is a flow diagram depicting a second technique embodying a second aspect of the present invention in which multiple trays of a printing machine are examined with the tray examiner of FIG. 13 to determine if enough print media for printing a selected number of multiple copies of an electronic ordered stock set resides in the multiple trays.

Referring now to both FIGS. 1, 13 and 14, a technique is addressed for examining print media trays 44 (and/or any number of additional trays associated therewith) remotely of the printer 8, with a "Tray Examiner", to determine if enough ordered stock is present to produce a given job. An assumption for the technique of FIG. 14 is that the remote user has an understanding of which print media trays will be used to hold the constituent stocks of the given job.

It will be appreciated that job programming could be stock-based instead of tray based. In a stock-based job programming approach, a user would not be required to have knowledge about target trays for a job, but rather a target printing machine or associated service would determine the amount of stock "on-hand" for any given stock type by reference to the job program provided by the user. In one example, available stock quantities for the target printer would be maintained in a database so that the tray examiner could access the database, rather than a set of trays, in order to implement the technique described below. It will also be appreciated by those skilled in the art that the service 270 includes a suitable control architecture for facilitating suitable communication between the Tray Examiner and a printing machine at which a job is to be executed.

Initially, at step 272, the number of ordered stock sets ("OSS") for the given job is determined from the program information of the job. Then, at step 274, the number of sheets is determined through use of a conventional stack height sensing arrangement which is capable of ascertaining how many sheets reside in a given tray based on knowledge—inferred or explicit—of the stock thickness or caliper.

It should be appreciated that, in one example, an ordered stock set may include multiple feeds in which one stock type is "pulled" multiple time from one of the print media trays 44. In this event, an exemplary sequence of ordered stock may appear as follows:

{1,2,2,3,4,5} where "1", "2", "3", "4" and "5" represent discrete stock types, respectively. It is understood that unless an accommodation for multiple feeds is made, an accurate assessment of whether enough pseudo or virtual ordered stock is present to produce a given job cannot, in all circumstances, be made. Accordingly, when a tray is to be used for multiple feeds, a normalized value for sheet number is developed.

If it is determined at step 276, that multiple feeds are to be employed, then the Number of Sheets (obtained in step 274) is normalized with the relationship: (Number of Sheets)/(Feeds per Ordered Set) (step 278). In the sequence immediately above, when examining the tray corresponding with the stock type 2, a Feeds per Ordered Set number of 2 would be employed. The current number for the first tray is buffered, via step 280, and then used with the comparison routine described below.

In addition to storing the number for the first tray, the process obtains any other necessary numbers through use of step 282 in which a determination is made as to whether any other tray(s) including ordered stock requires examination. The process can then either branch to step 286 for obtaining another number or use a completed set of numbers to perform the routine starting at step 288. For the sequence immediately above, the process would pass through state represented by step 286 four times to obtain numbers associated with the respective trays for stock 2, stock 3, stock 4 and stock 5.

Upon obtaining all of the necessary numbers for the trays with ordered stock, the numbers are scanned to obtain a minimum value—referred to as "MN". It will be appreciated that due to presence of the normalization subroutine, a value of MN may represent a relative rather than an absolute minimum. The value of MN is then compared with OSS (step 290) to determine if the tray having the relative minimum amount of sheets has enough sheets to meet the ordered stock requirements of the job associated with OSS. If the value of MN is less than OSS, then an exception is raised (step 292); otherwise, an indication informing a user of a positive condition is communicated to the service (step 294). In the event that an exception is raised, the user can be, among other things, informed of inadequate ordered stock supply or the printing system can be disabled (at least temporarily) relative to the subject job.

Numerous features of the above-described embodiments will be appreciated by those skilled in the art:

First, due to the distributed nature of ordered stock handling contemplated by the preferred embodiment, a reduction in stock cost is achieved. More particularly, it is common to maintain inventories of ordered stock sets. For instance, as contemplated by at least some ordered stock printing arrangements, N sets of ordered stock each having a modulus number of M are stored in anticipation of printing. With the subject technique, N discrete print media sheet sets are maintained in inventory. This latter approach is viewed as being more economical since the print media for the ordered stock sets need not be precollated and can thus be purchased in bulk volumes at minimum cost.

Second, the distributed nature of the ordered stock handling also eliminates the need to precollate stock in a tray. That is, to achieve N sets of ordered stock each having a modulus number of M, M discrete stock types are loaded into M respective print media trays and the system, rather than a system user, is responsible for collation. As contemplated herein, the collation is achieved through use of an ordered stock profile which keeps the system apprised as to which tray it should be pulling from in order to produce multiple copies of a preprogrammed ordered stock set.

Third, through use of the ordered stock profile, recovery from a jam condition can be made vastly more simple. By referencing pages of a job to discrete stock types, and by maintaining a mapping of the discrete stock types with respective print media trays, only a minimum number of stock need be purged in the case of a jam. In particular, when a stock sheet jams, the technique permits a current reference to be consulted so that, under ideal circumstances, only one sheet, rather than multiple sheets, need be referred.

Fourth, with the system of the preferred embodiment, job integrity is maximized. For instance, since each print media tray is devoted to just one stock type, the risk of delivering ordered stock out of order is virtually eliminated. Moreover, through use of a tray or other stock examination system, it can be insured that enough stock will be available to produce every copy of an ordered stock set required by a corresponding job.

Finally, the system allows for an advantageous conversion of a programmed job from one that depends on the use of ordered stock to one that uses constituent stocks of multiple trays. This conversion can be understood by reference to the following examplary scenario:

1) A job is programmed for use with ordered stock due to constraints with respect to the number of pick points available on the printer for which the job program was originally intended—this constraint is encountered in Xerox' DocuTech Publishing System;

2) The job is held for reprint (demand reprint paradigm) in such a manner that it can be produced on a printer other than the one used for the initial print run—the print on demand paradigm is often encountered in Xerox printing systems using a DocuTech Network Server;

3) The job is presented for reprint to a printer that has sufficient pick points such that ordered stock is not required; and 4) In this exemplary scenario, the advantages of the above-described technique can be achieved by simply providing the job with an ordered stock profile in accordance with the teachings of the preferred embodiment. As contemplated herein, the ordered stock profile is obtainable through processing of the job with the above-described utility.

What is claimed is:

1. In a printing system with at least two discrete print media trays, a marking engine and a controller in which prints are produced from a print job by using the controller to control delivery of print media sheets from the at least two discrete print media trays to the marking engine, the at least two discrete print media trays respectively including the print media sheets, a method for producing multiple copies of a set of electronic ordered stock from the at least two discrete print media trays, comprising:

(a) programming an ordered stock profile in which the set of electronic ordered stock is provided with at least two sequentially ordered electronic pages and each electronic page in the set corresponds with a set of print media properties, wherein the set of print media properties for one of the electronic pages differs from the set of print media properties for any one of the other electronic pages in the set of electronic ordered stock, and wherein a third electronic page is added to the set of electronic ordered stock with the third electronic page having a set of print media properties similar to that of one of the two sequentially ordered electronic pages;

(b) providing each electronic page of at least one copy of the set of electronic ordered stock with a reference, wherein each reference designates a correspondence between one of the at least two sequentially ordered electronic pages and one of the electronic pages of the at least one copy of the set of electronic ordered stock;

(c) mapping the at least two sequentially ordered electronic pages of the set of electronic ordered stock to the at least two discrete print media trays so that each copy of the set of electronic ordered stock is produced by delivering a print media sheet from a first one of the at least two discrete print media trays to the marking engine at a first time, a print media sheet from a second one of the at least two discrete print media trays to the marking engine at a second time, wherein the second time is subsequent to the first time; and (d) using the references provided in said step (b) to refeed a print media sheet from one of the at least two print media trays when a print media sheet previously fed from the one of the at least two print media trays must be purged from the system because of a print media jam condition.

2. In a printing system with at least two discrete print media trays, a marking engine and a controller in which prints are produced from a print job by using the controller to control delivery of print media sheets from the at least two discrete print media trays to the marking engine, the at least two discrete print media trays respectively including the print media sheets, a method for producing multiple copies of a set of electronic ordered stock from the at least two discrete print media trays, comprising:

(a) programming an ordered stock profile in which the set of electronic ordered stock is provided with at least two sequentially ordered electronic pages and each electronic page in the set corresponds with a set of print media properties, wherein the set of print media properties for one of the electronic pages differs from the set of print media properties for any one of the other electronic pages in the set of electronic ordered stock, and wherein a third electronic page is added to the set of electronic ordered stock with the third electronic page having a set of print media properties similar to that of one of the two sequentially ordered electronic pages; and (b) mapping the at least two sequentially ordered electronic pages of the set of electronic ordered stock to the at least two discrete print media trays so that each copy of the set of electronic ordered stock is produced by delivering a print media sheet from a first one of the at least two discrete print media trays to the marking engine at a first time, a print media sheet from a second one of the at least two discrete print media trays to the marking engine at a second time, wherein the second time is subsequent to the first time.

3. The method of claim 2, further comprising configuring the set of electronic ordered stock so that each electronic page comprises an electronic tab cut sheet, wherein each electronic tab cut sheet includes a tab with a position and the position of the tab of each electronic tab cut sheet differs from the position of any other tab within the set of electronic ordered stock.

4. The method of claim 2, in which the printing system includes a service and a printing machine including both the at least two print media trays and the marking engine, and in which the service communicates with the printing machine by way of a network connection, wherein said (a) includes programming the set of electronic ordered stock remotely of the printing machine with the service.

5. The method of claim 4, in which the service includes a utility, wherein said (a) includes using the utility to provide the job with information for facilitating either said programming of said (a) or said mapping of said (b).

6. The method of claim 5, wherein said using includes providing instructions regarding a manner in which the at least two discrete print media trays are to be loaded with print media sheets for printing the multiple copies of the set of electronic ordered stock.

7. The method of claim 5, wherein said using includes providing each electronic page of at least one copy of the set of electronic ordered stock with a reference, wherein each reference designates a correspondence between one of the at least two sequentially ordered electronic pages and one of the electronic pages of the at least one copy of the set of electronic ordered stock.

8. The method of claim 5, further comprising:

(c) electronically accessing each of the at least two discrete print media trays to determine if the at least two discrete print media trays include enough print media sheets to produce the multiple copies of the set of electronic ordered stock.

9. The method of claim 8, further comprising raising an exception when it is determined, with said (c), that the at least two discrete print media trays do not include enough print media sheets to produce the multiple copies of the set of electronic ordered stock.

10. The method of claim 2, wherein two print media sheets are delivered from one of the at least two discrete print media trays as each copy of the set of electronic ordered stock is produced.

11. The method of claim 2, wherein said (a) includes providing the ordered stock profile with an identifier so that, pursuant to producing a copy of one of the at least two electronic pages, the identifier is used to access the ordered stock profile for initiating said delivery of a print media sheet from one of the at least two discrete print media trays.

12. In a printing system with a marking engine in which prints are produced from a print job by delivering print media sheets to and marking print media sheets with the marking engine, an ordered stock production system for producing multiple copies of a set of electronic ordered stock comprising:

(a) at least two discrete print media trays, said at least two discrete print media trays respectively including the print media sheets;

(b) a user interface for programming an ordered stock profile in which the set of electronic ordered stock is provided with at least two sequentially ordered electronic pages and each electronic page in the set corresponds with a set of print media properties, wherein the set of print media properties for one of the electronic page differs from the set of print media properties for any one of the other electronic pages in the set of electronic ordered stock, and wherein a third electronic sage is added to the set of electronic ordered stock with the third electronic page having a set of print media properties similar to that of one of the two sequentially ordered electronic pages; and (c) a controller for mapping the at least two sequentially ordered electronic pages of the set of electronic ordered stock to the at least two discrete print media trays so that each copy of the set of electronic ordered stock is produced by delivering a print media sheet from a first one of the at least two discrete print media trays to the marking engine at a first time, a print media sheet from a second one of the at least two discrete print media trays to the marking engine at a second time, wherein the second time is subsequent to the first time.

13. The ordered stock production system of claim 12, wherein the set of electronic ordered stock is configured so that each electronic page comprises an electronic tab cut sheet, wherein each electronic tab cut sheet includes a tab with a position and the position of the tab of each electronic tab cut sheet differs from the position of any other tab within the set of electronic ordered stock.

14. The ordered stock production system of claim 12, in which the printing system includes a service and a printing machine including both the at least two print media trays and the marking engine, and in which said service communicates with the printing machine by way of a network connection, wherein the ordered stock profile is programmed remotely of the printing machine with said service.

15. The ordered stock production system of claim 14, wherein the printing machine includes a print media tray module coupled therewith, wherein the print media tray module includes a plurality of print media trays, each of which print media trays communicates with the marking engine.

16. The ordered stock production system of claim 14, in which said service includes a utility for facilitating said programming of the ordered stock profile.

17. The ordered stock production system of claim 14, wherein said service is used to electronically access each of the at least two discrete print media trays to determine if the at least two discrete print media trays include enough print media sheets to produce the multiple copies of the set of electronic ordered stock.

18. The ordered stock production system of claim 12, wherein a print media sheet is referred from one of the at least two print media trays, by reference to the ordered stock profile, when a sheet previously fed from the one of the at least two print media trays is purged from the system because of a print media jam condition.

* * * * *